(12) United States Patent
Sayn-Urpar et al.

(10) Patent No.: US 9,919,805 B2
(45) Date of Patent: Mar. 20, 2018

(54) METALLISATION OF AN ELECTRICALLY INSULATING HOUSING OF AN AERONAUTIC ENGINE

(71) Applicant: SNECMA, Paris (FR)

(72) Inventors: Julien Sayn-Urpar, Moissy-Cramayel (FR); Jeremy Edmond Fert, Moissy-Cramayel (FR); Thierry Kohn, Moissy-Cramayel (FR); Julien Pavillet, Moissy-Cramayel (FR)

(73) Assignee: SNECMA, Paris (FR)

( * ) Notice: Subject to any disclaimer, the term of this patent is extended or adjusted under 35 U.S.C. 154(b) by 706 days.

(21) Appl. No.: 14/528,467

(22) Filed: Oct. 30, 2014

(65) Prior Publication Data

US 2015/0115706 A1 Apr. 30, 2015

(30) Foreign Application Priority Data

Oct. 30, 2013 (FR) ...................... 13 60635

(51) Int. Cl.
| B64D 31/00 | (2006.01) |
| H01R 4/64 | (2006.01) |
| F01D 25/28 | (2006.01) |
| F02C 7/32 | (2006.01) |

(52) U.S. Cl.
CPC ............. *B64D 31/00* (2013.01); *F01D 25/28* (2013.01); *F02C 7/32* (2013.01); *H01R 4/64* (2013.01); *Y02T 50/672* (2013.01)

(58) Field of Classification Search
CPC ........... B64D 31/00; F01D 25/28; F02C 7/32; H01R 4/64
See application file for complete search history.

(56) References Cited

U.S. PATENT DOCUMENTS

| 3,710,568 A | 1/1973 | Rice | |
| 2005/0190547 A1* | 9/2005 | Berrada | H01R 4/64 361/807 |
| 2010/0206994 A1* | 8/2010 | Barber | B29C 70/205 244/53 R |
| 2012/0119572 A1* | 5/2012 | Pons | H01R 4/34 307/9.1 |
| 2013/0075539 A1* | 3/2013 | Seger | B29C 70/865 244/53 B |
| 2013/0160458 A1 | 6/2013 | Willmot et al. | |
| 2013/0160460 A1 | 6/2013 | Dalton et al. | |

(Continued)

FOREIGN PATENT DOCUMENTS

| EP | 2 607 651 A2 | 6/2013 |
| FR | 2 933 378 A1 | 1/2010 |

OTHER PUBLICATIONS

French Preliminary Search Report dated Jul. 30, 2014 in Patent Application No. 1360635 (with English Translation of Category of Cited Documents).

*Primary Examiner* — Scott Bauer
(74) *Attorney, Agent, or Firm* — Oblon, McClelland, Maier & Neustadt, L.L.P.

(57) ABSTRACT

An aeronautic engine including: a housing made of electrically insulating material and including at least one metallic piece; a structural piece of the engine including metallic material and connected to the housing; and an equipment fixed to the housing, is provided. The equipment is connected to the structural piece by the metallic piece by an electrically conductive connecting path.

8 Claims, 2 Drawing Sheets

(56) References Cited

U.S. PATENT DOCUMENTS

| | | |
|---|---|---|
| 2013/0160461 A1 | 6/2013 | Broughton et al. |
| 2013/0160462 A1 | 6/2013 | Broughton et al. |
| 2013/0160463 A1 | 6/2013 | Broughton et al. |
| 2013/0160464 A1 | 6/2013 | Maszczk et al. |
| 2013/0160465 A1 | 6/2013 | Broughton et al. |
| 2013/0161052 A1 | 6/2013 | Willmot et al. |
| 2013/0161094 A1 | 6/2013 | Broughton et al. |
| 2013/0189868 A1 | 7/2013 | Fitt et al. |
| 2013/0258583 A1 | 10/2013 | Balk et al. |
| 2013/0264110 A1 | 10/2013 | Willmot et al. |
| 2013/0298566 A1 | 11/2013 | Broughton et al. |
| 2014/0165531 A1 | 6/2014 | Broughton et al. |

\* cited by examiner

METALLISATION OF AN ELECTRICALLY INSULATING HOUSING OF AN AERONAUTIC ENGINE

FIELD OF THE INVENTION

The invention relates in general to double-flow gas turbine engines, and more particularly metallisation of a housing made of electrically insulating material for an aeronautic engine such as an OFD housing (Outer Fan Duct, that is, the external wall of the secondary vein).

TECHNOLOGICAL BACKGROUND

Housings made of composite materials have many advantages, including especially their weight reduced in comparison to equivalent metallic housings. Such housings can especially be made of composite material comprising for example a fibrous reinforcement densified by a matrix. The fibrous reinforcement can be formed by a winding in layers superposed on a mandrel of a fibrous texture obtained by three-dimensional weaving with evolutive thickness, to integrate the retention shield by simple localised increase in thickness.

Yet, since the matrix of these composite materials generally comprises material polymer such as resin, they exhibit major electrical resistance and therefore do not adequately conduct electricity to correctly evacuate electric power. However, the electrical equipment of the housing can be subject to an aggressive electromagnetic environment (especially to high-intensity radiated fields (or HIRF), lightning strikes, electromagnetic interference (EMI), etc., in which they must be capable of functioning nominally.

The result is considerable risk of damaging the equipment of the engine, such as the ignition box, or even mechanical equipment through which for example large quantities of oil or fuel pass.

Also, when electrical energy cannot be evacuated, it causes a substantial rise in temperature of the housing by joule effect. Composite materials used to make the fan retention housings are limited to a use temperature of generally under a hundred degrees. If this temperature is exceeded, the housing risks melting at least locally or burning (combustion) and no longer being able to support all or some of the electrical equipment which they support.

Also, in the event where the housing made of insulating material is an OFD housing, the latter is connected at the level of its downstream end to a thrust reverser. To evacuate electrical energy from the thrust reverser, it has been proposed to create a primary connecting path between the thrust reverser and the pylon of the aircraft. However, the applicant has noticed that this evacuation of electrical energy via this primary path was inadequate relative to the loads to be transited.

Document US 2013/189868 describes an engine comprising a housing and equipment fixed to the housing, as well as an electrically conductive connecting path for connecting the equipment to a metallic structure to evacuate electrons.

Document FR 2 933 378 per se describes mounting an antenna on an aircraft to produce and ensure metallisation of the antenna by its fastening bolts, including when the skin of the aircraft is made of composite material, by means a metallic socket connected electrically to the earth of the aircraft.

SUMMARY OF THE INVENTION

An aim of the invention is therefore to propose an aeronautic engine comprising a housing, especially an OFD housing, made of electrically insulating material such as composite material comprising a fibrous reinforcement densified by a polymer matrix, irrespective of the electromagnetic environment and irrespective of its dimensions, and which is also simple to manufacture at moderate cost.

For this, the invention proposes an aeronautic engine, comprising:
a housing, made of electrically insulating material, said housing comprising at least one metallic piece,
a structural piece of the engine, formed in metallic material and connected to the housing, and
equipment, fixed to the housing,
the equipment being connected to the structural piece by means of the metallic piece by means of an electrically conductive connecting path.

Advantageously, connecting equipment, whether electronic or mechanical, to the structural piece of the engine by means of the metallic piece of the housing creates a metallisation path for circulation of electrical energy, reducing the magnitude of loads and intensities circulating inside a single connecting path.

Some preferred, though non-limiting, characteristics of the aeronautic engine described hereinabove are the following:
the metallic piece of the housing comprises at least one of the elements of the following group: a flange, a slave arm, an inspection door threshold, an equipment threshold,
the engine also comprises a connecting flange, adapted to fix the housing on the structural piece, and in which the connecting path is connected to the structural piece by means of said connecting flange,
the connecting path comprises at least one of the following elements: a metal-metal contact, a ground braid,
the metal-metal contact comprises a metallic support fixed both to the equipment and also to the connecting flange,
the connecting path comprises successively the following elements: a metal-metal contact between the equipment and the metallic support, a ground braid between the metallic support and the metallic piece of the housing and a ground braid between the metallic piece of the housing and the structural piece; or a metal-metal contact between the equipment and the metallic support, a metal-metal contact between the metallic support and the metallic piece of the housing and a ground braid between the metallic piece of the housing and the structural piece; or a ground braid between the equipment and the metallic piece of the housing and a ground braid between the metallic piece of the housing and the structural piece,
the housing is an OFD housing and the structural piece is a fan housing,
the engine also comprises a thrust reverser, said thrust reverser being connected to the metallic piece of the OFD housing by means of an electrically conductive connecting path,
the equipment comprises at least one of the elements of the following group: an ignition box, a sensor, a fuel-oil exchanger FOHE, a weight of fuel metered WFM, and
the insulating material of the housing comprises composite material comprising a fibrous reinforcement densified by a polymer matrix.

BRIEF DESCRIPTION OF THE DRAWINGS

Other characteristics, aims and advantages of the present invention will emerge more clearly from the following detailed description, and with respect to the appended drawings given by way of non-limiting examples and in which.

DETAILED DESCRIPTION OF AN EMBODIMENT

Figure 1:
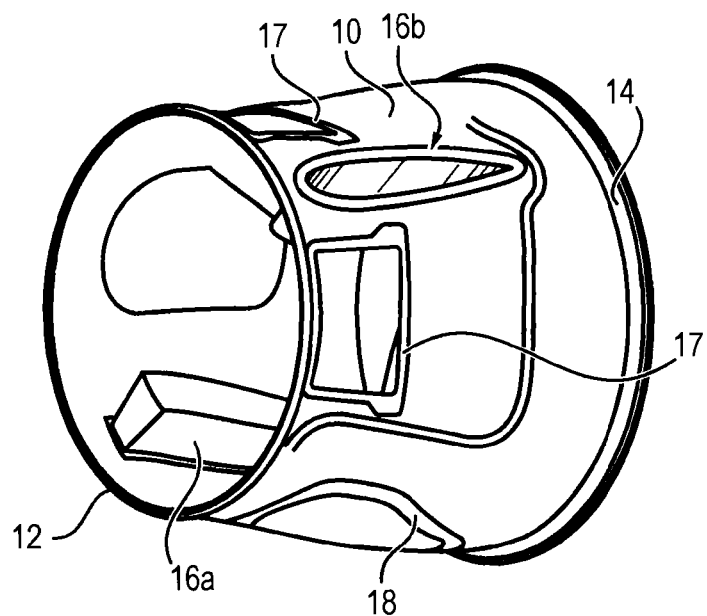
FIG. 1 is a perspective view of an example of composite housing which can be used in an engine according to the invention.
Figure 2:
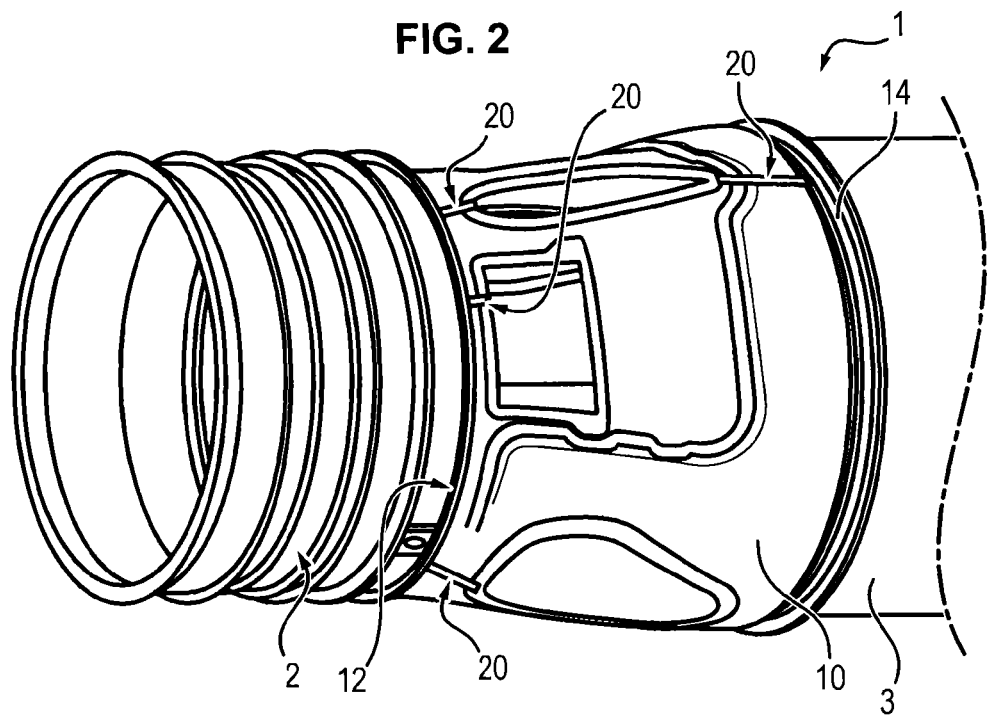
FIG. 2 illustrates the electrical connection of the housing of FIG. 1 to an example of a metallic fan housing and a thrust reverser in an engine according to the invention.
Figure 3:
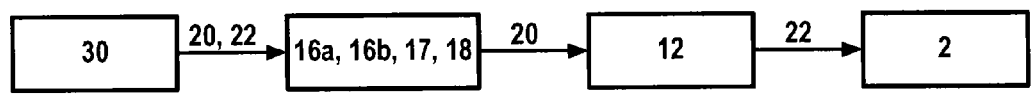
FIG. 3 illustrates schematically an embodiment according to the invention of connecting electrical equipment fixed to the housing of FIG. 1 to a structural metallic piece of the engine via a metallic piece of the housing.

A gas turbine engine 1 generally comprises, from upstream to downstream in the direction of gas flow, a fan, one or more compressor stages, for example a low-pressure compressor and a high-pressure compressor, a combustion chamber, one or more turbine stages, for example a high-pressure turbine and a low-pressure turbine, and a gas discharge pipe.

The turbines can be coupled to the compressor and the fan by respective coaxial shafts.

The engine 1 is housed inside a housing comprising several parts corresponding to different elements of the engine 1, including an OFD housing. The OFD housing 10 can be made in a single piece and comprises, at the level of its axial ends, flanges 12, 14. A first flange 12, called upstream, enables affixing of the OFD housing to a fan housing 2 by means of linking members of 4—nut screws 5 type, with interposition of an annular spigot applied to each of the upstream and downstream flanges, while the second flange 14, called downstream, enables connection of the OFD housing 10 to a thrust reverser 3.

The fan housing 2 is made of metal, for example titanium, in metallic alloy based on titanium or aluminium. The thrust reverser 3 is as such mainly made of composite material comprising a metallic structure.

In the following, the invention will be described more particularly in the context of the OFD housings 10 of a gas turbine engine, made of a composite material comprising a fibrous reinforcement densified by an electrically insulating matrix. This is not however limiting, to the extent where the invention applies mutatis mutandis to any engine comprising a housing made of electrically insulating material and able to be used in severe electromagnetic environments.

The fibrous reinforcement of the OFD housing 10 comprises fibres, especially carbon, glass, aramide or ceramic. The matrix per se is typically a polymer matrix, for example epoxide, bismaleimide or polyimide.

The reinforcement can be formed by winding on to a mandrel a fibrous texture made by three-dimensional weaving with evolutive thickness as per the description of application FR 2 913 053, the fibrous reinforcement constituting a complete fibrous preform of the OFD housing 10 formed in a single piece with reinforcing parts corresponding to the flanges 12, 14.

Electronic or mechanical equipment 30 can be fixed to the housing, for example, an ignition box 30c, sensors, a fuel-oil heat exchanger FOHE 30a, a weight of fuel metered WFM 30b, etc.

For better distribution of loads and intensities in the engine 1, especially in case of an aggressive electromagnetic environment, the electrical equipment 30 is connected by means of a metallic piece of the OFD housing 10 to a structural metallic piece of the engine 1, preferably a piece adjacent to the OFD housing 10, by means of an electrically conductive connection path.

For example, the equipment 30 can be connected to one at least of the following metallic pieces of the fan housing 10: a flange, a threshold of a slave arm (such as the threshold 16a of the slave arm at 6h or the threshold 16b of the slave arm at 12h), a threshold 18 of inspection hatch, equipment thresholds 17, etc. These different metallic pieces 16a, 16b, 17, 18 are in turn connected to one of the flanges of the OFD housing 10, preferably the upstream flange 12 which is fixes to the fan housing 2 of the engine 1, via a metal-metal contact, that is, a mechanical assembly with direct contact between the metallic pieces. The upstream flange 12 is preferably selected for evacuation of electrical loads, to the extent where their localisation relative to the upstream flange produces the shortest ground braids possible.

Also, in an embodiment, the different metallic pieces 16a, 16b, 17, 18 can also be connected to the downstream flange 14 of the OFD housing 10, which is fixed to the thrust reverser 3 of the engine 1 via a metal-metal contact. This produces a connecting path between the thrust reverser 3 and the fan housing 2 passing through the OFD housing 10, improving evacuation of loads from the thrust reverser 3 simply and inexpensively.

The connection between the equipment 30 and the metallic pieces 16a, 16b, 18 of the OFD housing 10 and the metallic structural pieces 2, 3 of the engine 1 can be made by means of ground braids 20 and/or metal-metal contact 22. Ground braid 20 here means a set of electrical wires or, alternatively, an elongated metallic part, adapted to join two pieces together for evacuation of electrons.

Advantageously, by passing through by means of the metallic pieces 16a, 16b, 17 and 18 of the OFD housing 10, the distance covered by the ground braids 20 can be reduced by selecting the metallic pieces 16a, 16b, 17 and 18 and the structural pieces 2, 3 best adapted to limit the length of the electrical connecting path as a function of the position of the various equipment 30. In fact, it is preferable for the ground braids 20 to have a length of less than 20 cm and a length/width ratio of the order of 5 to optimise its operation. A ground braid 20 having an excessively high ration would risk in fact not adequately evacuating electrons. It now becomes possible to metallise the equipment 30, irrespective of its position on the OFD housing 10, even in the event where this equipment 30 is fixed at a substantial distance from the structural pieces 2 of the engine 1, because of the metallic pieces 16a, 16b, 18 which form an integral part of the OFD housing 10. This is especially the case of the thrust reverser 3, when connected electrically by means of ground braids 20 and metal-metal contacts 22 to the fan housing 2 via the metallic pieces 16a, 16b, 17 and 18 of the OFD housing.

The connection between the metallic pieces 16a, 16b and 18 of the OFD housing 10 and the upstream flange 12, and is required the downstream flange 14, can as such be made by means of one or more ground braids 20.

Each item of equipment 30 can fixed to one or more metallic supports 32. For example, the equipment 30 can be fixed to four supports metallic 32 which can form four support points, arranged at the level of four opposite corners of the equipment 30. As a variant, the equipment 30 can be fixed to two overall elongated metallic supports 32, each extending on either side of the equipment 30. According to yet another variant, the metallic support 32 can comprise one or more metallic fastening feet.

For passage of current, the equipment 30 and all or some of the metallic supports 32 are preferably connected electrically. This electrical connection can especially be set up by means of ground braids 20, fixed between the computer and the metallic supports 32. As a variant, the electrical connection can also be made by means of a reversed current network.

Figure 4:
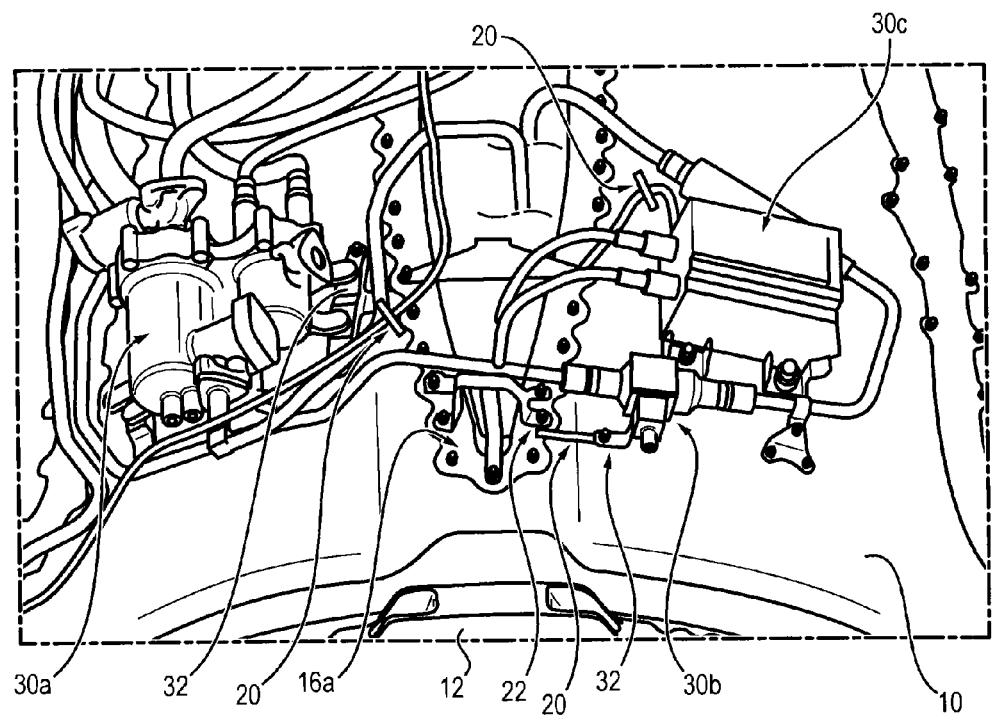
FIG. 4 illustrates the connection of examples of equipment to a slave arm 6h of a housing.

In the embodiment illustrated in FIG. 4, different possible connection paths between equipments 30 and structural pieces of the engine 1, passing through the slave arm at 6h of the OFD housing 10 have been illustrated.

Here, the FOHE equipment 30a is fixed by means of its metallic support 32 to the OFD housing 10 via a metal-metal contact 22. One of the metallic supports 32 is connected via a ground braid 20 to the threshold 16a of the slave arm at 6h, which in turn is connected by means of another ground braid 20 to the upstream flange 12 of the OFD housing 10. The upstream flange 12 is finally fixed to the fan housing 2, which is metallic, by a metal-metal contact 22.

The sensor WFM 30b as such is fixed by means of metallic feet 32 to the OFD housing 10. The sensor WFM 30b is connected to the threshold of a slave arm, either by a ground braid or by elongating the metallic feet 32 of its support. In this way, in the embodiment of FIG. 4, the sensor WFM 30 is connected to the threshold 16a of the slave arm at 6h via a ground braid 20. This sensor 30b is therefore not in direct contact with the insulating material of the OFD housing 10. The threshold 16a of the slave arm at 6h is then connected to the upstream flange 12 by a ground braid 20, which is in turn fixed to the fan housing 2 via a metal-metal contact.

The ignition box 30c finally is fixed to the OFD housing 10 by means is pins generally made of insulating material of elastomer type to dampen vibrations. The ignition box 30c is therefore directly connected by means of a ground braid 20 to the threshold 16a of the slave arm at 6h, which is in turn connected via another ground braid to the upstream flange 12. Lastly, the upstream flange 12 is connected to the fan housing 2 via a metal-metal contact.

In the three embodiments described hereinabove, metallisation is systematically carried out via the threshold 16a of the slave arm at 6h. But this is not limiting, metallisation able to be carried out at any other metallic point of the arm 16a, or even via the threshold 16b of the slave arm at 12h.

In addition, evacuation of electrons is done here by means of the upstream flange 12 and the fan housing 2. It is understood of course, in a variant embodiment, that the threshold 16a of the slave arm at 6h could also be connected to the downstream flange 14 via the ground braid 20, to also enable metallisation of the thrust reverser 3. The ground braid 20 should simply be adapted to adequately evacuate electrons.

The invention claimed is:

1. An aeronautic engine, comprising:
a housing, made of electrically insulating material, said housing comprising at least one metallic piece, and
a structural piece of the engine, comprising metallic material and connected to the housing,
an equipment, fixed to the housing,
wherein the equipment is electrically connected to the structural piece through an intermediary of the metallic piece due to an electrically conductive connecting path, and
wherein the connecting path comprises successively the following elements:
a metal-metal contact between the equipment and a metallic support, a ground braid between the metallic support and the metallic piece of the housing and a ground braid between the metallic piece of the housing and the structural piece, or
a metal-metal contact between the equipment and the metallic support, a metal-metal contact between the metallic support and the metallic piece of the housing and a ground braid between the metallic piece of the housing and the structural piece, or
a ground braid between the equipment and the metallic piece of the housing and a ground braid between the metallic piece of the housing and the structural piece.

2. The aeronautic engine according to claim 1, wherein the metallic piece of the housing comprises at least one of a flange, a slave arm, an inspection door threshold, and an equipment threshold.

3. The aeronautic engine according to claim 1, further comprising a connecting flange, adapted to fix the housing to the structural piece, and wherein the connecting path is connected to the structural piece by said connecting flange.

4. The aeronautic engine according to claim 3, wherein the metallic support fixed both to the equipment and the connecting flange.

5. The aeronautic engine according to claim 1, wherein the housing is an OFD housing and the structural piece is a fan housing.

6. The aeronautic engine according to claim 5, further comprising a thrust reverser, said thrust reverser being connected to the metallic piece of the OFD housing with an electrically conductive connecting path.

7. The aeronautic engine according to claim 1, wherein the equipment comprises at least one of an ignition box, a sensor, a fuel-oil heat exchanger, and a weight of fuel metered sensor.

8. The aeronautic engine according to claim 1, wherein the insulating material of the housing comprises composite material comprising a fibrous reinforcement densified by a polymer matrix.

* * * * *